United States Patent [19]

Okuyama

[11] 4,373,746
[45] Feb. 15, 1983

[54] LEG PROTECTOR FOR PASSENGER IN VEHICLE

[75] Inventor: Hiroo Okuyama, Yokohama, Japan

[73] Assignee: Nissan Motor Company, Limited, Kanagawa, Japan

[21] Appl. No.: 215,255

[22] Filed: Dec. 11, 1980

[30] Foreign Application Priority Data

Dec. 12, 1979 [JP] Japan .............................. 54-172085[U]

[51] Int. Cl.³ ............................................. B60R 21/00
[52] U.S. Cl. .................................................... 280/752
[58] Field of Search ........................ 280/751, 752, 730

[56] References Cited
U.S. PATENT DOCUMENTS 3,930,665  1/1976  Ikawa ................................ 280/752
3,936,090  2/1976  Aya ................................... 280/751
4,098,525  7/1978  Schwanz ............................ 280/751

*Primary Examiner*—Joseph F. Peters, Jr.
*Assistant Examiner*—John A. Carroll

[57] ABSTRACT

A protector for preventing legs and feet of a person in a vehicle when it collided consists of a panel in the form of a curved body extending toward a seat for the person and is provided with a pad adhered to a surface facing said seat. The protector disclosed herein includes the panel comprising at least one closed channel including a space therein filled with an energy absorption member, thereby greatly increasing plastic deformation load and yield load of the panel to prevent the legs and feet from being hurt.

5 Claims, 9 Drawing Figures

LEG PROTECTOR FOR PASSENGER IN VEHICLE

BACKGROUND OF THE INVENTION

1. Field of the Invention

The present invention relates to a protector for preventing legs and feet of a person in a vehicle in collision.

2. Description of the Prior Art

Protectors of various constructions have been proposed to prevent a person in a vehicle from being hurt by absorbing the kinetic energy to which legs and feet of the person are subjected, when the vehicle collided. In one example, as shown in FIG. 1, panels 1 of steel plates are curved and laminated and the plates are provided with a pad 2 adhered to a surface of the panel extending and facing to a seat of a vehicle. This assembly is secured to an inside of a passenger compartment of the vehicle by means of brackets 10 and 12 secured to the vehicle body so as to absorb kinetic energy in the legs and feet of the person when the vehicle collided by plastic deformations of the panels.

With this arrangement, however, the deformations or collapsing strokes of the panel for absorbing the energy are depending upon thicknesses of the panels. When the panels are thin for the purpose of reducing the weight of the protector, the deformations or strokes of the panels become large which made difficult the arrangement of other parts located in the vehicle compartment. On the other hand, when the panels are so constructed as to make small their deformations or strokes in order to obviate the above difficulty, thick panels are needed, so that a light weight protector cannot be obtained.

Other protectors have been proposed, one of which includes a panel formed with a plurality of depressions arranged side by side or with a plurality of depressions and a plurality of through-apertures alternately arranged. With this arrangement, however, the panels do not exhibit adequate energy absorption due to comparatively large plastic deformations by small forces, although they exhibit particular energy absorption characteristics.

SUMMARY OF THE INVENTION

It is a primary object of the present invention to provide an improved protector for legs and feet of a person in a vehicle, which eliminates all the disadvantages of the prior art.

It is an object of the invention to provide a protector secured to a passenger compartment of a vehicle, comprising closed channels on a panel, and energy absorption members filled in spaces of the closed channels to solve the above problems of the prior art.

The invention will be more fully understood by referring to the following detailed specification and claims taken in connection with the appended drawings.

DETAILED DESCRIPTION OF THE PREFERRED EMBODIMENT

Figure 1:
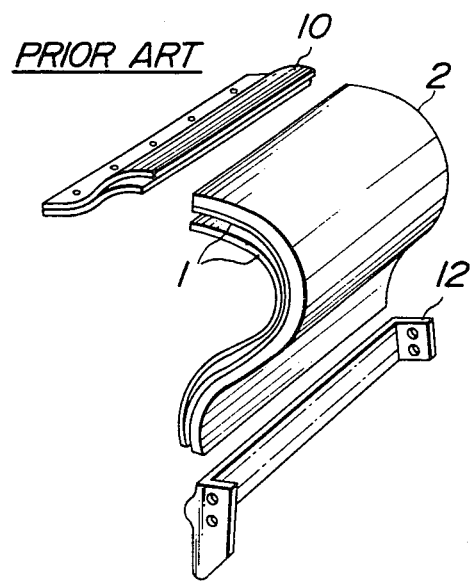
FIG. 1 is a perspective view of a leg protector of the prior art as mentioned above.
Figure 2:
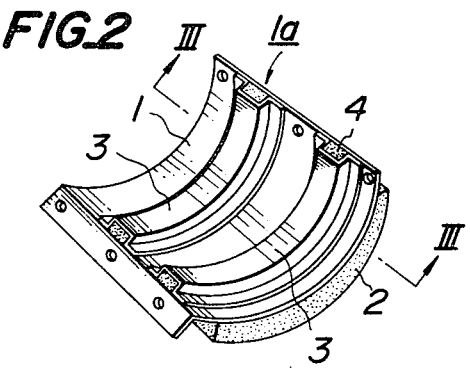
FIG. 2 is a perspective view of one embodiment of a protector according to the present invention.
Figure 3:
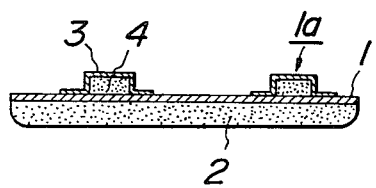
FIG. 3 is a sectional view of the protector taken along a line III—III in FIG. 2.

Referring to FIGS. 2 and 3 illustrating one embodiment of the present invention, a panel 1 of a leg protector is a curved body having an appropriate radius of curvature extending toward a passenger seat (not shown). The panel 1 is made of a steel plate or other metal plate. Channel members 3 are fixed in vertical directions spaced by a suitable distance to an inner surface of the panel 1. Each channel member 3 is made of a metal plate similar to that of the panel 1 and has a channel shaped cross-section having flanges, opening of which channel faces the inner surface of the panel. The channel member is curved with a radius of curvature in its vertical plane and has a length equal to that of the panel in a vertical direction. The flanges of the channel member 3 are fixed to the inner surface of the panel 1 by means of suitable means such as spot welding to form a closed channel 1a including a space having a constant volume in the vertical direction. In this embodiment illustrated, there are two parallel channel members 3. However, the panel may be provided with at least one channel member 3 which may be increased in number, if required. The cross-sectional configuration and area of the channel member 3 may be selected depending upon sizes of the panel or the number of the channel members. A foamable synthetic resin 4 is then charged into the spaces in the channels 1a formed by the panel 1 and channel members 3 and is then foamed therein so as to fill the spaces. Various materials may be used for this purpose, but polyurethane is the most preferable. The space in the channel 1a should be completely filled with the foamed plastic material, but the filled density of the foamed material may be selected depending upon requirements. The panel 1 is provided with a pad 2 of a synthetic material covering and adhered to the surface of the panel facing the passenger seat.

Figure 4:
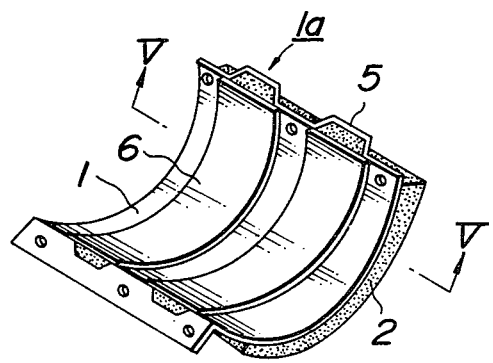
FIG. 4 is a perspective view of another embodiment of a protector according to the present invention.
Figure 5:
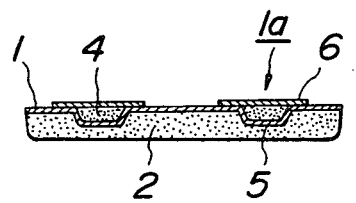
FIG. 5 is a sectional view taken along a line V—V in FIG. 4.

Referring to FIGS. 4 and 5 illustrating another embodiment of the invention, a panel 1 made of a metal plate similar to that in FIG. 2 is formed with grooves 5 in vertical directions spaced by a suitable distance, bottoms of which grooves extend toward the seat of a vehicle. Openings of the grooves are closed by patch members 6 which are fixed to an inner surface of the panel by welding to form closed channels 1a. The bottoms of the grooves 5 may extend inwardly of the panel 1 opposite to that illustrated in the drawings. In the same manner as in the previous embodiment, spaces formed by the grooves 5 are filled with foamable polyurethane and the panel 1 is provided with a pad 2 adhered to its surface facing the seat of the vehicle in the same manner as in the previous embodiment.

As can be seen from the above embodiments according to the invention, the panel 1 comprises the closed channels 1a including the constant volume spaces vertically extending between portions of the panel fixed to the vehicle body, thereby increasing the yield load of the panel corresponding to its deformation. Moreover, the spaces in the closed channels 1a are filled with the foamed polyurethane 4 whose elasticity effectively absorb the kinetic energy upon deformation of the panel 1 and increase loads on plastic deformations of the panel 1.

Figure 6:
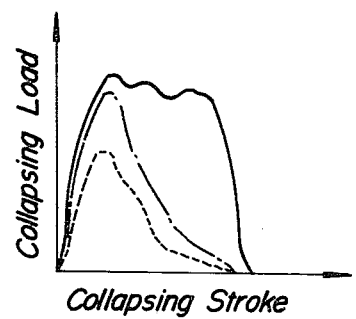
FIG. 6 is a graph comparing collapsing characteristics of protectors according to the invention and the prior art.

FIG. 6 illustrates results of load tests on the leg protectors according to the invention and prior art. Three comparative collapse characteristic curves are shown in FIG. 6. The dotted line illustrates the characteristic curve of the prior art protector. The dot-and-dash line shows the characteristic curve of protectors each consisting of a panel formed with channels including closed spaces without foamed polyurethane. The solid line illustrates the characteristic of the protector according to the invention. As can be seen from FIG. 6, yield loads and loads on plastic deformations of the protectors of the prior art are remarkably low and energy absorption characteristic is not satisfactory. The protectors of the prior art including closed channels increase their yield loads but rapidly decrease plastic deformation loads after the yield loads, so that their energy absorption characteristic is not sufficient. On the other hand, with the protectors according to the invention, high plastic deformation loads can be maintained corresponding to collapsing strokes, so that the panels exhibit high strengths and very good energy absorption characteristic.

In the above embodiment, the closed channels 1a are arranged vertically, but horizontally arranged channels may be provided in addition to the vertically arranged channels.

Figure 7:
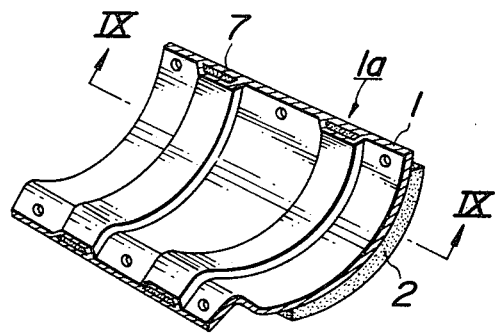
FIG. 7 is a perspective view of a further embodiment of a protector according to the present invention.
Figure 8:
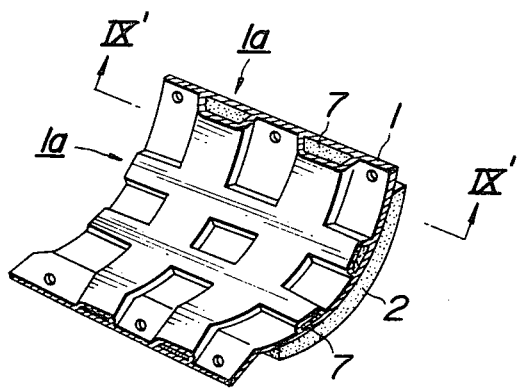
FIG. 8 is a perspective view of another embodiment of a protector according to the present invention.
Figure 9:
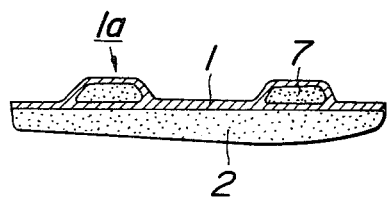
FIG. 9 is a sectional view taken along a line IX—IX in FIG. 7 or a line IX'—IX' in FIG. 8.

Referring to FIGS. 7-9 illustrate further embodiments of the present invention wherein panels 1 are formed of a synthetic resin and formed with closed channels by themselves without using channel members or patch members. In FIG. 7, two closed channels 1a are vertically formed on the inner side of the panel. In FIG. 8, two vertical closed channels and two horizontal closed channels are arranged on the inner side of the panel. Such constructions of panels can be molded as by the blowing molding. With these embodiments, a low temperature foamable synthetic resin, for example, low temperature foamable polyurethane is charged in spaces of the closed channels 1a and is then foamed so as to be filled in the spaces. Reference numerals 2 in FIGS. 7-9 illustrate pads of a synthetic resin.

As can be seen from the above description, the leg protector according to the invention comprises the panel including the closed channels and energy absorption members filled in spaces in the closed channels. With this construction, the strength of the panel is very high and its energy absorption efficiency is remarkably improved owing to small collapsing stroke resulting from large yield loads and plastic deformation loads of the panel, when the protector is subjected to an impact from legs of a passenger in a vehicle when collided. If required, the collapsing characteristic of the panel can be comparatively easily controlled by modifying the shape and number of the closed channels and material and filled density of the energy absorption members filled in the spaces in the closed channels. Moreover, the provision of the closed channels does not increase the weight of the protector in comparison with protectors of the prior art, so that the protector according to the invention is very effective for a small type automobile because of the light weight of the protector. Furthermore, the panel made of a synthetic resin integrally formed with the channels is more lighter and more advantageous in mass-productivity.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A leg protector for a passenger in a vehicle, said protector being made of a panel in the form of a curved body extending toward a seat for the passenger and provided with a pad adhered to a surface facing said seat, said panel further being in the form of a hemicylindrical member whose longitudinal axis is substantially horizontal and comprising at least one closed channel substantially vertically extending along said curved body and filled with an energy absorption material for absorbing kinetic energy from the legs of a passenger upon collision of the vehicle.

2. A leg protector as set forth in claim 1, wherein said closed channel consists of the panel and a channel member having flanges for securing the member to said panel.

3. A leg protector as set forth in claim 1, wherein said closed channel consists of a groove formed in said panel and having a bottom extending toward said seat, and a patch member closing an opening of said groove.

4. A leg protector as set forth in claim 1, wherein said panel and said closed channel are made of steel plates and said kinetic energy absorption material is foamable polyurethane.

5. A leg protector as set forth in claim 1, wherein said panel is made of a synthetic resin integrally formed with said at least one closed channel.

* * * * *